US010063729B1

(12) United States Patent
Hagiwara et al.

(10) Patent No.: US 10,063,729 B1
(45) Date of Patent: Aug. 28, 2018

(54) TERMINAL, METHOD OF RETRIEVING AUTHENTICATION-RELATED INFORMATION, AND PROGRAM CAUSING TERMINAL TO PERFORM PROCESS OF RETRIEVING AUTHENTICATION-RELATED INFORMATION

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Takahiro Hagiwara, Chiba Chiba (JP); Hiroshi Watanabe, Yokohama Kanagawa (JP); Akihiro Mizutani, Mishima Shizuoka (JP); Toshihiro Ida, Mishima Shizuoka (JP); Yusuke Hamada, Mishima Shizuoka (JP); Koji Endo, Sunto Shizuoka (JP); Kazuhiro Kamimura, Mishima Shizuoka (JP); Kazuhiro Ogura, Hiratsuka Kanagawa (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/461,616

(22) Filed: Mar. 17, 2017

(30) Foreign Application Priority Data

Feb. 9, 2017 (JP) ................................. 2017-022055

(51) Int. Cl.
*G06F 15/00* (2006.01)
*H04N 1/00* (2006.01)
(Continued)

(52) U.S. Cl.
CPC ....... *H04N 1/00912* (2013.01); *G06F 3/1222* (2013.01); *G06F 3/1236* (2013.01);
(Continued)

(58) Field of Classification Search
CPC .......... H04N 1/00912; H04N 1/32765; H04N 1/00244; H04N 2201/0094; G06F 3/1236; G06F 3/1238; G06F 3/1222; G06F 3/1288
(Continued)

(56) References Cited

U.S. PATENT DOCUMENTS

| 2013/0188221 A1* | 7/2013 | Ohno | ................... G06F 3/1296 358/1.15 |
| 2015/0264191 A1* | 9/2015 | Kawano | ................. G06F 21/44 358/1.14 |

FOREIGN PATENT DOCUMENTS

| JP | 2014-186440 | 10/2014 |
| JP | 5814904 | 10/2015 |

* cited by examiner

*Primary Examiner* — Saeid Ebrahimi Dehkordy
(74) *Attorney, Agent, or Firm* — Amin, Turocy & Watson LLP

(57) ABSTRACT

According to one embodiment, there is provided a terminal that includes a memory and a processor. The memory stores authentication-related information indicating that a first cloud completes approval of authentication, which is acquired by a terminal from the first cloud that transmits an instruction to perform a job to a job-performing apparatus of which registration is completed based on an instruction from the terminal, if the registration of the job-performing apparatus is completed. The processor retains the authentication-related information in a storage area if the job-performing apparatus is registered with the first cloud, and, if the authentication-related information is not present in the
(Continued)

memory after the approval by the first cloud, acquires the authentication-related information from the storage area.

20 Claims, 6 Drawing Sheets

(51) Int. Cl.
  *G06F 3/12* (2006.01)
  *H04N 1/327* (2006.01)
(52) U.S. Cl.
  CPC .......... *G06F 3/1238* (2013.01); *G06F 3/1288* (2013.01); *H04N 1/00244* (2013.01); *H04N 1/32765* (2013.01); *H04N 2201/0094* (2013.01)
(58) Field of Classification Search
  USPC ................................................ 358/1.13–1.15
  See application file for complete search history.

TERMINAL, METHOD OF RETRIEVING AUTHENTICATION-RELATED INFORMATION, AND PROGRAM CAUSING TERMINAL TO PERFORM PROCESS OF RETRIEVING AUTHENTICATION-RELATED INFORMATION

CROSS-REFERENCE TO RELATED APPLICATION

This application is based upon and claims the benefit of priority from Japanese Patent Application No. 2017-022055, filed Feb. 9, 2017, the entire contents of which are incorporated herein by reference.

FIELD

Embodiments described herein relate generally to a technology that registers a job-performing apparatus with a cloud.

BACKGROUND

In the related art, a cloud is known that performs cloud printing which causes a printer to print content data that has to be printed, based on a printing instruction from a terminal (for example, JP-A-2014-146112).

In order to use a cloud, identification information on a printer that is used by a user, or user identification information needs to be in advance registered with a cloud. if the registration is completed, a terminal generates authentication-related information indicating that the cloud completes approval of the terminal and the user. The terminal recognizes that the registration of a printer with the cloud is completed, by using the authentication-related information if the user logs in on the cloud, and can perform printing using the printer of which the registration is completed, through the cloud.

At this point, there are times if the terminal deletes the authentication-related information due to a user's erroneous operation or the like. In this case, the terminal needs to again register identification information on the printer, or the like with the cloud and to reacquire the authentication-related information.

However, if reregistering the printer with the cloud, because the printer is already previously registered, the same printers are registered redundantly with the cloud. In a cloud mechanism, because it is assumed that the same printers are not registered redundantly, if the same printers are registered with the cloud redundantly, there is a concern that the printing will not be able to be normally performed using the cloud.

An object of an exemplary embodiment is to provide a technology that prevents job-performing apparatuses to be registered with a cloud redundantly.

DETAILED DESCRIPTION

In general, according to an embodiment, there is a terminal that includes a memory and a processor. The memory stores authentication-related information indicating that a first cloud completes approval of authentication, which is acquired by a terminal from the first cloud that transmits an instruction to perform a job to a job-performing apparatus of which registration is completed based on an instruction from the terminal, if the registration of the job-performing apparatus is completed. The processor retains the authentication-related information in a storage area if the job-performing apparatus is registered with the first cloud, and, if the authentication-related information is not present in the memory after the approval by the first cloud, acquires the authentication-related information from the storage area.

In general, according to another embodiment, there is provided a method in which a terminal retrieves authentication-related information indicating that a first cloud completes approval of authentication by the terminal, which is acquired by the terminal from the first cloud that transmits an instruction to perform a job to a job-performing apparatus of which registration is completed based on an instruction from the terminal, if the registration of the job-performing apparatus is completed, the method including: storing the authentication-related information in the memory in the terminal and in a storage area that is different from the memory if the registration of the job-performing apparatus is completed; receiving approval of authentication from the first cloud; and acquiring the authentication-related information from the storage area if the authentication-related information is not present in the memory.

In general, according to still another embodiment, there is provided a program that causes a terminal to perform a process of retrieving authentication-related information indicating that a first cloud completes approval of authentication by the terminal, which is acquired by the terminal from the first cloud that transmits an instruction to perform a job to a job-performing apparatus of which registration is completed based on an instruction from the terminal, if the registration of the job-performing apparatus is completed, the process including: storing the authentication-related information in the memory in the terminal and in a storage area that is different from the memory if the registration of the job-performing apparatus is completed; receiving approval of authentication from the first cloud; and acquiring the authentication-related information from the storage area if the authentication-related information is not present in the memory.

Each embodiment will be described below with reference to the drawings.

Figure 1:
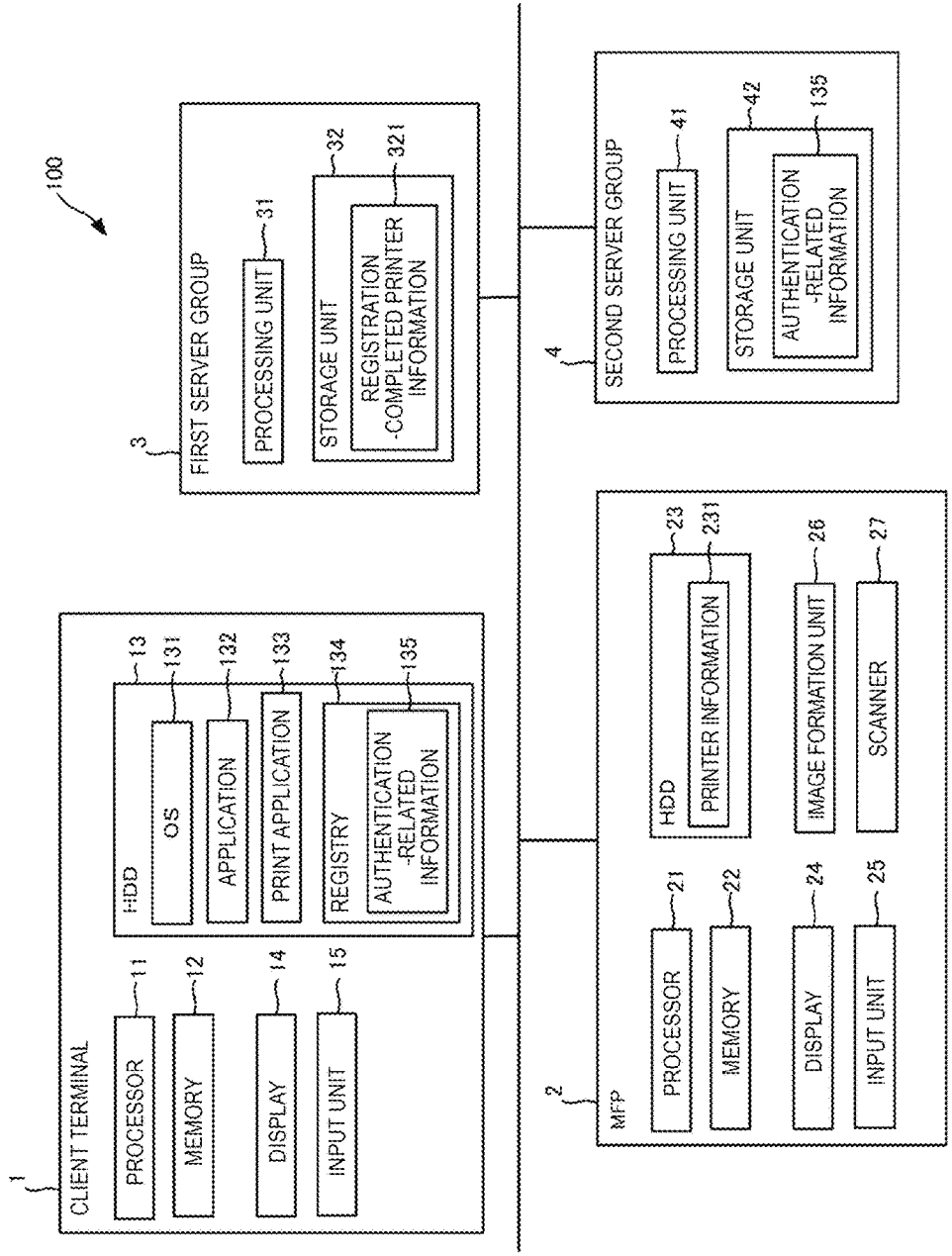
FIG. 1 is a diagram illustrating a configuration of a printing system.

FIG. 1 is a diagram illustrating a configuration of a printing system 100.

The printing system 100 includes a client terminal 1, an MFP 2, a first server group 3, and a second server group 4.

In FIG. 1, for illustration, a personal computer (PC) or a smartphone is assumed as the client terminal 1, but, as will be described below, the client terminal 1 may be the MFP 2. The multi-function peripheral (MFP) 2 has a plurality of functions, such as printing, scanning, faxing, and e-mail transmission. The first server group 3 forms a cloud (a first cloud) that performs cloud printing. The cloud refers to an entity that provides a service via the Internet. The second server group 4 forms a cloud (a second cloud) that provides a storage area. Elements 1 to 4 are networked via the Internet, and are connected to one another. Only one client terminal 1 and only one MFP 2 are illustrated in FIG. 1, but a plurality of client terminals 1 and a plurality of MFPs 2 are assumed to be connected to a network.

The client terminal 1 includes a processor 11, a memory 12, a hard disk drive (HDD) 13, a display 14, and an input unit 15.

The processor 11 controls the entire client terminal 1. The processor 11 executes a program within the memory 12 or the HDD 13, and thus realizes each function. The HDD 13 stores various pieces of information necessary for processing by the processor 11. The display 14 displays an image. The input unit 15 is a keyboard, a mouse, a touch panel, or the like, and receives input of user's operation.

The HDD 13 stores an operating system (OS) 131, an application 132, a print application 133, and a registry 134. The processor 11 causes the OS 131 to be started, and reads the applications 132 and 133, thereby realizing various functions. The print application 133 is a program for transmitting various files to the first server group 3 for printing with the MFP 2. Furthermore, the print application 133 has a function of enabling the processor 11 to perform Acts 11 to 14 and 21 to 28 that will be described below.

The registry 134 is a database of setting information that is used in the OS 131. The registry 134 stores basic information relating to the OS 131, settings of the applications 132 and 133, a user password, or the like. The print application 133 retains authentication-related information 135 that will be described below in the registry 134.

The MFP 2 includes elements 21 to 25 that are the same as the elements 11 to 15, and, additionally, includes an image formation unit 26 and a scanner 27. The image formation unit 26 forms an image on a sheet. The image formation unit 26 forms a latent image on a photo-sensitive body using a laser, develops the latent image using a toner, and thus forms a toner image on the photo-sensitive body. The image formation unit 26 transfers the toner image on the photo-sensitive body onto a sheet. The image formation unit 26 may inject ink from a head and may form an image on a sheet. The scanner 27 captures the image on the sheet using an imaging element, and generates image data. The HDD 23 stores in advance printer information 231 that is information for identifying the MFP 2. The printer information 231 is a model name, a serial number, a MAC address, or the like, and includes identification information specific to the MFP 2.

The first server group 3 functions as a processing unit 31 and a storage unit 32. A plurality of servers that constitute the first server group 3 may play the role of the functional units 31 and 32 in cooperation with each other. The processing unit 31 provides a cloud printing service to the client terminal 1. That is, the processing unit 31 receives various files that have to be printed, and a print instruction from the client terminal 1 that receives approval of user authentication. The processing unit 31 refers to the authentication-related information 135 of the client terminal 1, and specifies registration-completed printer information 321 that is associated with user identification information.

Based on a file and a print instruction that are received from the client terminal 1, the processing unit 31 generates a print job that the MFP 2 which is indicated by the registration-completed printer information 321 is able to perform. The processing unit 31 transmits the print job to the MFP 2 that is indicated by the registration-completed printer information 321, and causes the MFP 2 to perform the print job. The storage unit 32 includes a storage device, such as an HDD, within the first server group 3, and stores the registration-completed printer information 321 that will be described below.

The second server group 4 functions as a processing unit 41 and a storage unit 42. The processing unit 41 provides a cloud storage service to the client terminal 1. The storage unit 42 includes a storage device, such as an HDD, within the second server group 4, and stores the authentication-related information 135 that will be described below.

Figure 2:
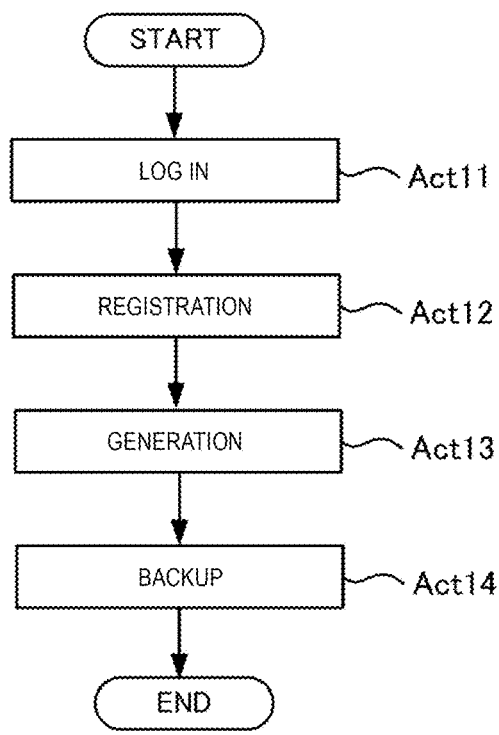
FIG. 2 is a flowchart illustrating registration processing by a client terminal.

The client terminal 1 needs to register the MFP 2 to be used, with the first server group 3, before being provided with the cloud printing service from the first server group 3. Registration processing by the client terminal 1 will be described below will reference to a flowchart in FIG. 2.

Figure 3:
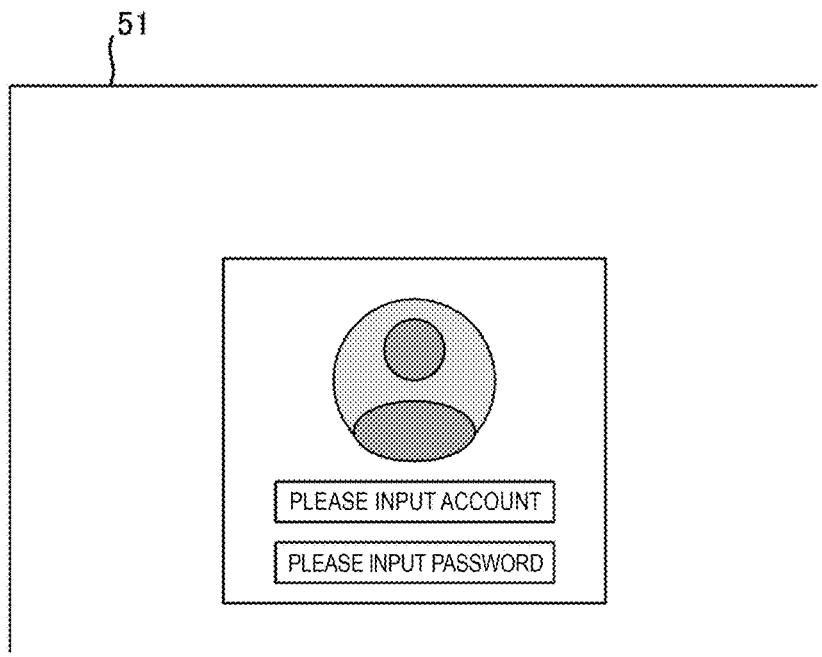
FIG. 3 is a diagram illustrating a log-in screen for logging in on a first server group.

FIG. 3 is a diagram illustrating a log-in screen 51 for logging in on the first server group 3.

The client terminal 1 accesses the first server group 3, and opens the log-in screen 51. The client terminal 1 displays web page screens 52 to 56 that will be described below, each of which includes the log-in screen 51, on the display 14, using data and the like that are received from the first server group 3.

The client terminal 1 receives the user identification information that includes an account or a password, on the log-in screen 51. The client terminal 1 transmits the user identification information to the first server group 3, and receives approval of a user authentication from the first server group 3 (Act 11). According to the present embodiment, the second server group 4, which is assumed to cooperate with the first server group 3, performs the user authentication approval on the client terminal 1 with the approval of the user authentication by the first server group 3.

Figure 4:
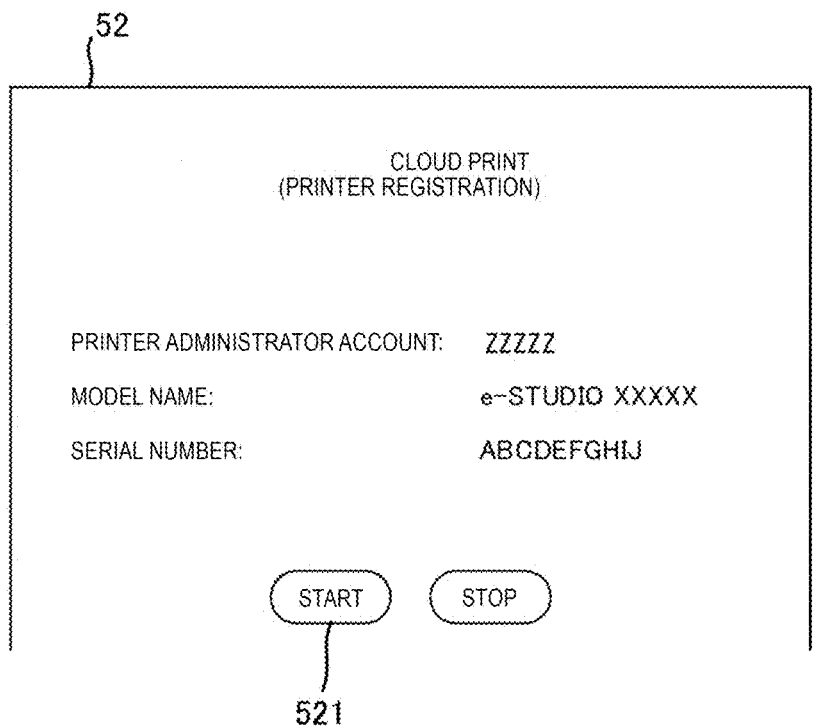
FIG. 4 is a diagram illustrating a confirmation screen for confirming a detail of registration of an MFP.

FIG. 4 is a diagram illustrating a confirmation screen 52 for confirming a detail of the registration of the MFP 2.

The client terminal 1 receives input by a user of data on the MFP 2 to be registered, from an input screen that is not illustrated. The client terminal 1 communicates with, for example, the MFPs 2 on a network, and displays a listing of MFPs 2 on the network. Then, in the client terminal 1, the user makes a selection among the MFPs 2, and thus the client terminal 1 acquires the printer information 231 on the MFP 2 from the selected MFP 2.

Based on the printer information 231 and the user identification information, the client terminal 1 displays the confirmation screen 52 for confirming the detail of the registration of the MFP 2. The confirmation screen 52 displays, for example, a printer administrator account that is the user identification information, and a model name and a serial number that are included in the printer information 231. The client terminal 1 receives input from a start button 521 on the confirmation screen 52, and transmits the printer information 231 and the user identification information to the first server group 3.

The first server group 3 stores the printer information 231 and the user identification information, as the registration-completed printer information 321, in the storage unit 32, in a state of being associated with each other. A plurality of pieces of registration-completed printer information 321 may be present for the user identification information on the basis of the printer information 231 on the MFP 2. In this manner, the client terminal 1 registers the MFP 2 with the first server group 3 (Act 12).

On this occasion, the client terminal 1 acquires an access token, a refreshment token, a XMPP jabber ID, or the like from the first server group 3. The client terminal 1 generates the authentication-related information 135 that includes the access token, the refreshment token, the XMPP jabber ID and the printer information 231 (Act 13). The authentication-related information 135 indicates that the first server group 3 completes the approval of the user authentication by the client terminal 1. By using the authentication-related information 135, the client terminal 1 causes the first server group 3 to recognize the client terminal 1 that is associated with the registration-completed printer information 321.

For example, the access token is a character string for identifying the approval-completed client terminal 1. The client terminal 1 transmits the access token each time a request is received from the first server group 3. Accordingly, the first server group 3 recognizes that the client terminal 1 is a client terminal 1 that is associated with the registration-completed printer information 321.

Before deleting the registration-completed printer information 321 from the first server group 3, there are times if the client terminal 1 deletes the authentication-related information 135 by deleting the print application 133 due to a user's erroneous operation or the like. In this case, as is described in BACKGROUND, although the client terminal 1 receives the approval of the user authentication by the first server group 3, the client terminal 1 is not recognized by the first server group 3 that the client terminal 1 itself is a client terminal 1 that is associated with the registration-completed printer information 321. For this reason, in the related art, there occurs a need to register a new registration-completed printer information 321 again in order to obtain the authentication-related information 135, and thus there occurs a situation where an old registration-completed printer information 321 and a new registration-completed printer information 321 for the same MFP 2 are registered redundantly.

In order to solve this problem, the client terminal 1 according to the present embodiment retains the authentication-related information 135 in the second server group 4 and backs up the authentication-related information 135 (Act 14).

Figure 5:
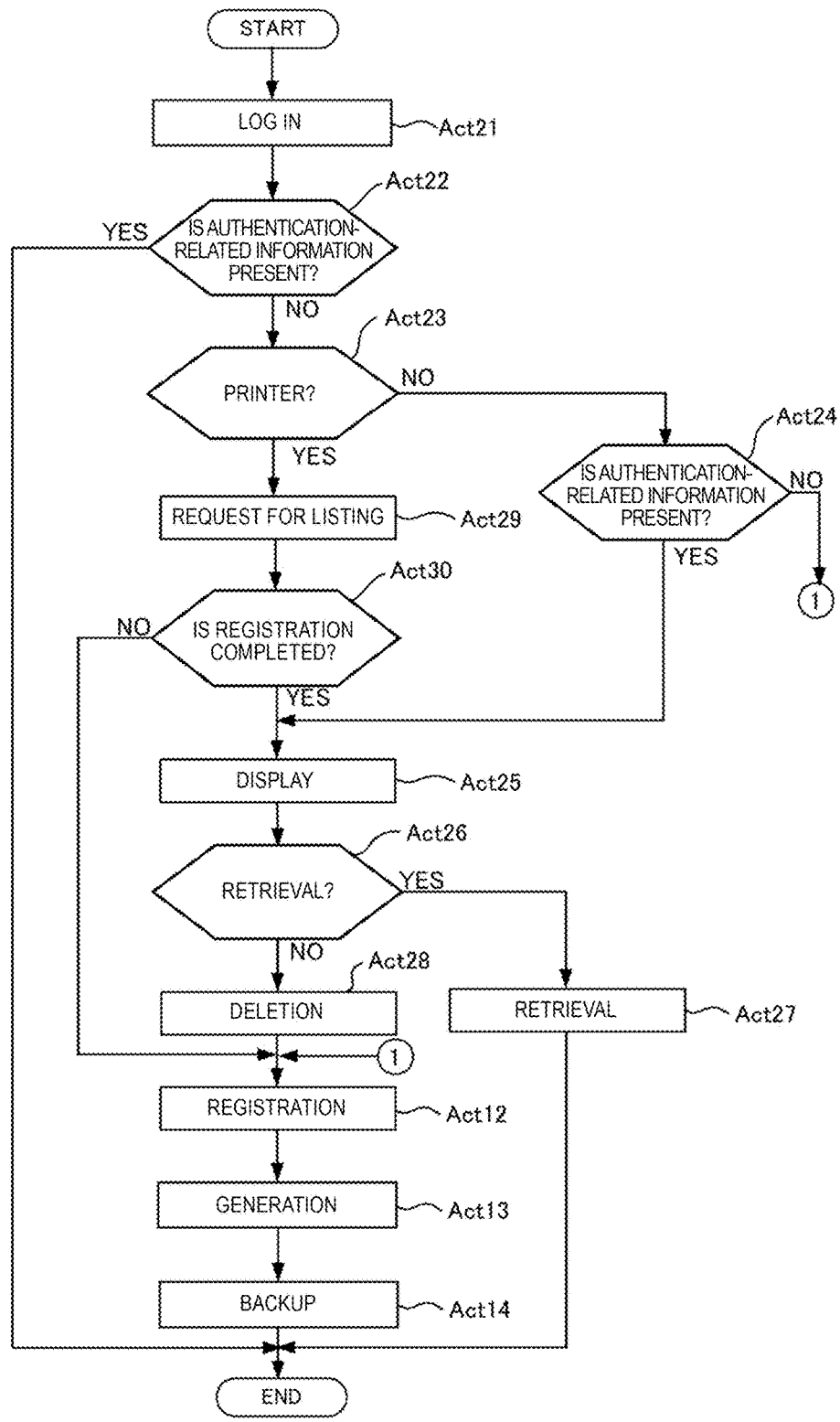
FIG. 5 is a flowchart illustrating registration processing after registration of the MFP.

The registration processing if the approval is received from the first server group 3 after the registration of the MFP 1 will be described below with reference to a flowchart in FIG. 5.

In the same manner as in Act 11, the client terminal 1 transmits user information to the first server group 3, makes an authentication request, and receives the approval from the first server group 3 (Act 21).

The client terminal 1 determines whether or not the authentication-related information 135 is present in the registry 134 (Act 22). If the authentication-related information 135 is retained (YES in Act 22), the client terminal 1 ends the registration processing.

If the authentication-related information 135 is not present (NO in Act 22), if the client terminal 1 is a PC or the like that has no printer information 231 (NO in Act 23), the client terminal 1 refers to the authentication-related information 135 in the second server group 4, which is associated with the user information (Act 24).

If the authentication-related information 135 that is associated with the user information is not present in the second server group 4 (NO in Act 24), the client terminal 1 performs Act 12 to Act 14, which are described above. Act 12 to Act 14 will be again described below.

Figure 6:
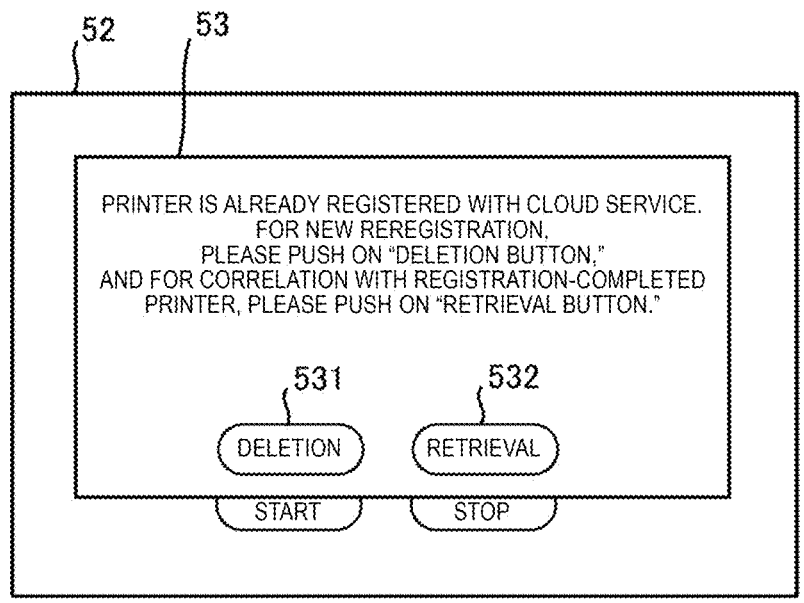
FIG. 6 is a diagram illustrating a retrieval screen for the registration of the MFP.

FIG. 6 is a diagram illustrating a retrieval screen 53 for the registration of the MFP 2.

If the authentication-related information 135 is present in the second server group 4 (YES in Act 24), the client terminal 1 displays the retrieval screen 53 for the registration of the MFP 2 (Act 25). Displayed on the retrieval screen 53 is a notification that the printer (the MFP 2) is previously registration-completed by the user. Displayed on the retrieval screen 53 is a notification that for new registration of a printer (a MFP 2), a deletion button 531 has to be pushed on and that for retrieval of the registration-completed printer (the MFP 2), a retrieval button 532 has to be pushed on.

If input by the user from the retrieval button 532 is received (YES in Act 26), the client terminal 1 acquires the authentication-related information 135, which is associated with the user information, from the second server group 4 (Act 27).

Figure 7:
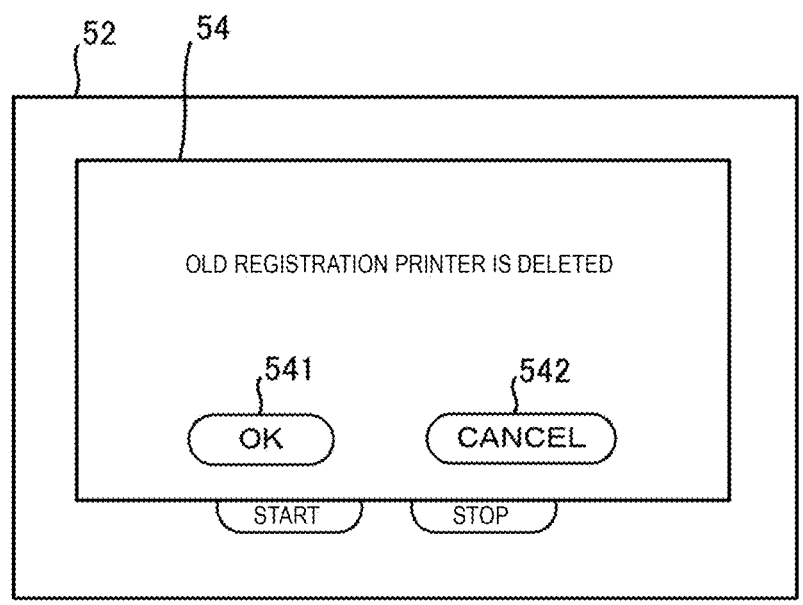
FIG. 7 is a diagram illustrating a screen for deleting the registration of the MFP.

FIG. 7 is a diagram illustrating a screen 54 for deleting the registration of the MFP 2.

If input by the user from the deletion button 531 is received (NO in Act 26), the client terminal 1 displays the screen 54 for deleting the registration of the MFP 2 that is associated with the user identification information, and receives input from an OK button 541. Then, the client terminal 1 deletes the registration-completed printer information 321, which is associated with the user identification information, from the first server group 3, and deletes the authentication-related information 135, which is associated with the user identification information, from the second server group 4 (Act 28).

On this occasion, if a plurality of pieces of registration-completed printer information 321, each of which is associated with the user identification information, are present, the client terminal 1 may display a screen for selecting which MFP 2 the registration-completed printer information 321 to be deleted is on. Then, the client terminal 1 may delete the registration-completed printer information 321 on the selected MFP 2, from the first server group 3, and deletes the authentication-related information 135, which is associated with the printer information 231 on the selected MFP 2 and the user identification information, from the second server group 4.

The client terminal 1 performs Act 12 to Act 14, which are described above, and reregisters the registration-completed printer information 321 on the MFP 2 that is newly selected by the user, with the first server group 3. Furthermore, the client terminal 1 generates the authentication-related information 135, which is associated with the printer information 231 on the MFP 2 and the user identification information. The client terminal 1 retains the authentication-related information 135 in the second server group 4 for backup (Acts 12 to 14).

Subsequently, a case where the client terminal 1 is the MFP 2 is described. In this case, the MFP 2 is assumed to include an OS 131, an application 132, a print application 133, and a registry 134 that are the same as those in the client terminal 1 described above, and to include the authentication-related information 135 and the printer information 231 within the registry 134.

In the same manner as in Act 11, the MFP 2, as the client terminal 1, transmits the user identification information to the first server group 3, makes the authentication request, and receives the approval from the first server group 3 (Act 21).

The MFP 2 determines whether or not the authentication-related information 135 is present in the registry 134 (Act 22). The MFP 2 is assumed to determine that the authentication-related information 135 is not present due to the user's erroneous operation or the like (NO in Act 22). Because the MFP 2 has the printer information 231 (YES in Act 23), and the MFP 2 makes a request to the first server group 3 for a listing of pieces of registration-completed printer information 321 that are associated with the user information (Act 29).

The MFP 2 determines whether or not the registration-completed printer information 321 on the MFP 2 is present in the listing of pieces of registration-completed printer information 321, which is received from the first server group 3 (Act 30). For example, if a serial number included in the printer information 231 on the MFP 2 is not included in the registration-completed printer information 321 in the listing, the MFP 2 determines that the registration-completed printer information 321 on the MFP 2 is not present in the listing (NO in Act 30). In this case, the MFP 2 performs Acts 12 to 14 of registering the registration-completed printer information 321 on the MFP 2 itself with the first server group 3.

If the printer information 231 (for example, the serial number) on the MFP 2 is included in the registration-completed printer information 321 in the listing, the MFP 2 determines that the registration-completed printer information 321 on the MFP 2 is present in the listing (YES in Act 30).

Figure 8:
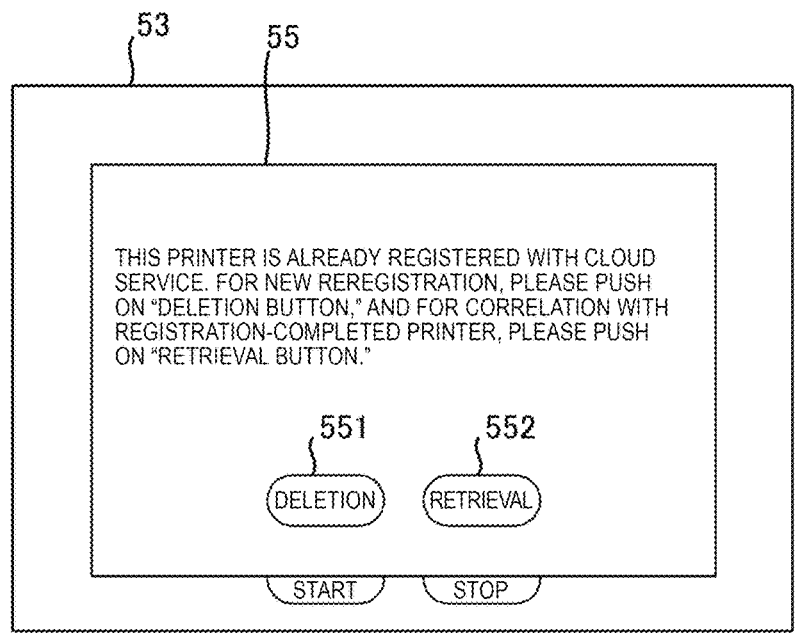
FIG. 8 is a diagram illustrating the retrieval screen for the registration of the MFP.

FIG. 8 is a diagram illustrating a retrieval screen 55 for the registration of the MFP 2.

In this case, the MFP 2 displays the retrieval screen 55 for registration of the MFP 2 (Act 25). Displayed on the retrieval screen 55 is a notification that the printer (the MFP 2) is previously registration-completed. Displayed on the retrieval screen 55 is a notification that for new reregistration of the printer (the MFP 2), a deletion button 551 has to be pushed on and that for retrieval of the registration of the printer (the MFP 2), a retrieval button 552 has to be pushed on.

If input by the user from the retrieval button 552 is received (YES in Act 26), the MFP 2 acquires the authentication-related information 135, which is associated with the user identification information and the printer information 231 on the MFP 2, from the second server group 4 (Act 27).

Figure 9:
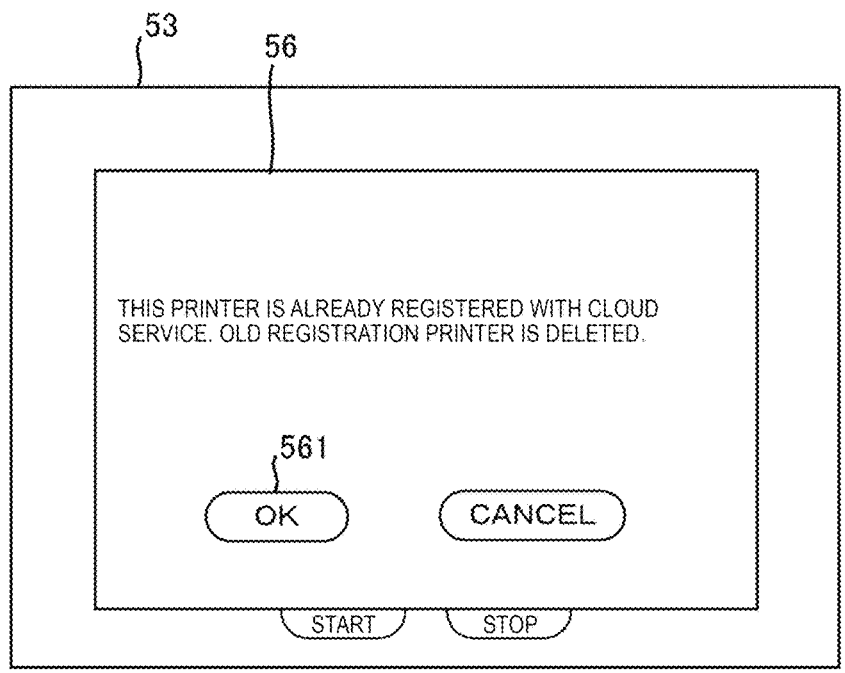
FIG. 9 is a diagram illustrating a screen for deleting the registration of the MFP.

FIG. 9 is a diagram illustrating a screen 56 for deleting the registration of the MFP 2.

If input by the user from the deletion button 551 is received (NO in Act 26), the MFP 2 displays the screen 56 for deleting the registration of the MFP 2 and receives input from an OK button 561. Then, the MFP 2 deletes the registration-completed printer information 321, which is associated with the user identification information and the printer information 231 on the MFP 2, from the first server group 3. Furthermore, the MFP 2 deletes the authentication-related information 135, which is associated with the user identification information and the printer information 231 on the MFP 2, from the second server group 4 (Act 28).

According to the present embodiment, by employing this configuration, multiple registrations, which occur if the printer that is registered with the cloud printing service (the first server group 3) loses the authentication-related information 135 due to a malfunction or a mistake, can be prevented.

According to the present embodiment, the second server group 4 as a cloud that operates for 24 hours per day is used as a backup destination of the authentication-related information 135, processing for the retrieval of the authentication-related information 135 can be always performed. Furthermore, if the second server group 4 is provided as a free-charge online storage service, according to the present embodiment, because the second server group 4 is used, the cost can be reduced more than if a dedicated server is installed as the backup destination of the authentication-related information 135.

Modification Example

According to the present embodiment, the printer (the MFP 2) is given as an example of a job-performing apparatus to which the first server group 3 (the cloud) has to transmit an instruction to perform a job based on an instruction from the client terminal 1. However, the job-performing apparatus may be a scanner and may be a fax machine. The scanner reads an image on a sheet that is set, generates image data, and retains the image data in a storage area, such as a memory in the scanner. The first server group 3 may transmit to the scanner an instruction to perform a scan job of reading a sheet that is set on the scanner, or an instruction to perform a job of performing e-mail transmission of image data that is obtained through the scanning. The first server group 3 may transmit to the fax machine an instruction to read a sheet that is set on the fax machine and to perform FAX transmission of image data.

In the present specification, the transmission by the first server group 3 of the instruction to perform a job to the job-performing apparatus includes transmission of a job to the job-performing apparatus. Therefore, transmission by the first server group 3 of a print job to a printer, transmission to the FAX machine of a FAX transmission job that includes image data and a transmission destination setting, and transmission by the first server group 3 of an instruction to perform a job to the job-performing apparatus (the printer or the fax machine) are included. The fax machine receives the image data and retains the received image data in a storage area, such as a memory in the fax machine. The FAX transmission jobs include a job of transmitting the image data that is received by the fax machine and is retained in the storage area, such as the memory in the fax machine, to the client terminal 1 or the like in the format, such as the mail format or the portable document format (PDF).

In the present specification, the transmission by the first server group 3 of the instruction (the command) to perform a job to the job-performing apparatus includes transmission of designation of a job setting that is retained in the job-performing apparatus and of an instruction to perform a job according to the job setting, and transmission of a job setting and a performance instruction themselves. Therefore, the transmission by the first server group 3 of a setting (for example, a retention destination (a transmission destination)) of a scan job of reading a sheet that is set on the scanner and of an instruction to perform a scan job according to the setting to the scanner is included in the transmission by the first server group 3 of the instruction to perform a job to the job-performing apparatus (for example, the scanner). The scan jobs include an instruction to print the image data after the scanning and an instruction to transmit the image data to the client terminal 1 or the like.

The client terminal 1 may not be a PC or a smartphone, and may be an MFP 2, a printer, a fax machine, a scanner, or the like, to which the first server group 3 has to transmit the instruction to perform a job.

According to the embodiment, the second server group 4 as the backup destination of the authentication-related information 135 is given as an example. However, the backup destination of the authentication-related information 135 may be a storage area that is different from a storage destination of the authentication-related information 135 in the client terminal 1. The backup destination of the authentication-related information 135, for example, may be a HDD that is separate from the HDD 13 that connects to the client terminal 1.

According to the present embodiment, a technology can be provided that prevents apparatuses from being registered redundantly with a cloud.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A terminal, comprising:
a memory that stores authentication-related information indicating that a first cloud completes approval of authentication, which is acquired by the terminal from the first cloud that transmits an instruction to perform a job to a job-performing apparatus of which registration is completed based on an instruction from the terminal, if the registration of the job-performing apparatus is completed, wherein the job-performing apparatus performs at least printing functionality, faxing functionality or scanning functionality; and
a processor that retains the authentication-related information in a storage area if the job-performing apparatus is registered with the first cloud, and, if the authentication-related information is not present in the memory after the approval by the first cloud, acquires the authentication-related information from the storage area, wherein the processor deletes the authentication-related information from the storage area and begins a new registration process in response to a determination that the job-performing apparatus is deleted from the first cloud.

2. The terminal according to claim 1,
wherein the storage area is included in a second cloud.

3. The terminal according to claim 2,
wherein the job-performing apparatus includes an image formation device configured to form an image on a sheet,
wherein the job is a print job,
wherein the terminal is the job-performing apparatus and retains printer information that is identification information on the job-performing apparatus,
wherein the first cloud retains registration-completed printer information, which is associated with the printer information and user identification information, and
wherein, after the approval of a user by the first cloud, if the authentication-related information is not present in the memory, if the registration-completed printer information, which is associated with the printer information on the job-performing apparatus and the user identification information, is present in the first cloud, the processor acquires the authentication-related information from the storage area.

4. The terminal according to claim 3,
wherein the job-performing apparatus is a fax machine that receives and retains image data, and
wherein the first cloud transmits an instruction to perform a FAX transmission job of performing FAX transmission of the image data to a destination, to the fax machine.

5. The terminal according to claim 3,
wherein the job-performing apparatus is a scanner that reads an image on a sheet that is set and generates image data, and
wherein the first cloud transmits an instruction to perform a scan job of reading the image on the sheet and generating the image data, to the scanner.

6. The terminal according to claim 2,
wherein, after the approval, if the registration of the job-performing apparatus with the first cloud is completed and the authentication-related information is not present in the memory, the processor displays on a display a screen for selecting whether the registration of the job-performing apparatus is deleted from the first cloud or the authentication-related information is acquired from the storage area.

7. The terminal according to claim 2,
wherein the job-performing apparatus is a fax machine that receives and retains image data, and
wherein the first cloud transmits an instruction to perform a FAX transmission job of performing FAX transmission of the image data to a destination, to the fax machine.

8. The terminal according to claim 2,
wherein the job-performing apparatus is a scanner that reads an image on a sheet that is set and generates image data, and
wherein the first cloud transmits an instruction to perform a scan job of reading the image on the sheet and generating the image data, to the scanner.

9. The terminal according to claim 1,
wherein the job-performing apparatus includes an image formation device configured to form an image on a sheet,
wherein the job is a print job,
wherein the terminal is the job-performing apparatus and retains printer information that is identification information on the job-performing apparatus,
wherein the first cloud retains registration-completed printer information, which is associated with the printer information and user identification information, and
wherein, after the approval of a user by the first cloud, if the authentication-related information is not present in the memory, if the registration-completed printer information, which is associated with the printer information on the job-performing apparatus and the user identification information, is present in the first cloud, the processor acquires the authentication-related information from the storage area.

10. The terminal according to claim 9,
wherein, after the approval, if the registration of the job-performing apparatus with the first cloud is completed and the authentication-related information is not present in the memory, the processor displays on a display a screen for selecting whether the registration of the job-performing apparatus is deleted from the first cloud or the authentication-related information is acquired from the storage area.

11. The terminal according to claim 9,
wherein the job-performing apparatus is a fax machine that receives and retains image data, and
wherein the first cloud transmits an instruction to perform a FAX transmission job of performing FAX transmission of the image data to a destination, to the fax machine.

12. The terminal according to claim 9,
wherein the job-performing apparatus is a scanner that reading an image on a sheet that is set and generates image data, and
wherein the first cloud transmits an instruction to perform a scan job of reading the image on the sheet and generating the image data, to the scanner.

13. The terminal according to claim 1,
wherein, after the approval, if the registration of the job-performing apparatus with the first cloud is completed and the authentication-related information is not present in the memory, the processor displays on a display a screen for selecting whether the registration of the job-performing apparatus is deleted from the first cloud or the authentication-related information is acquired from the storage area.

14. The terminal according to claim 13,
wherein the job-performing apparatus is a scanner that reads an image on a sheet that is set and generates image data, and
wherein the first cloud transmits an instruction to perform a scan job of reading the image on the sheet and generating the image data, to the scanner.

15. The terminal according to claim 1,
wherein the job-performing apparatus is a fax machine that receives and retains image data, and
wherein the first cloud transmits an instruction to perform a FAX transmission job of performing FAX transmission of the image data to a destination, to the fax machine.

16. The terminal according to claim 1,
wherein the job-performing apparatus is a scanner that reads an image on a sheet that is set and generates image data, and
wherein the first cloud transmits an instruction to perform a scan job of reading the image on the sheet and generating the image data, to the scanner.

17. A method in which a terminal retrieves authentication-related information indicating that a first cloud completes approval of authentication by the terminal, which is acquired by the terminal from the first cloud that transmits an instruction to perform a job to a job-performing apparatus of which registration is completed based on an instruction from the terminal, if the registration of the job-performing apparatus is completed, the method comprising:
storing the authentication-related information in the memory in the terminal and in a storage area that is different from the memory if the registration of the job-performing apparatus is completed, wherein the job-performing apparatus performs at least printing functionality, faxing functionality or scanning functionality;
receiving approval of authentication from the first cloud;
acquiring the authentication-related information from the storage area if the authentication-related information is not present in the memory; and
in response to determining that the job-performing apparatus is deleted from the first cloud, deleting the authentication-related information from the storage area and beginning a new registration process.

18. The method according to claim 17,
wherein the storage area is included in a second cloud.

19. The method according to claim 17,
wherein the job-performing apparatus includes an image formation device configured to form an image on a sheet,
wherein the job is a print job,
wherein the terminal is the job-performing apparatus and retains printer information that is identification information on the job-performing apparatus,
wherein the first cloud retains registration-completed printer information, which is associated with the printer information and user identification information, and
wherein, after the approval of a user by the first cloud, if the authentication-related information is not present in the memory, if the registration-completed printer information, which is associated with the printer information on the job-performing apparatus and the user identification information, is present in the first cloud, the authentication-related information is acquired from the storage area.

20. A non-transitory computer readable storage medium comprising computer-executable instructions, that in response to execution, cause a terminal to perform operations, comprising:
retrieving authentication-related information indicating that a first cloud completes approval of authentication by the terminal, which is acquired by the terminal from the first cloud that transmits an instruction to perform a job to a job-performing apparatus of which registration is completed based on an instruction from the terminal, if the registration of the job-performing apparatus is completed, wherein the job-performing apparatus performs at least printing functionality, faxing functionality or scanning functionality;
storing the authentication-related information in the memory in the terminal and in a storage area that is different from the memory if the registration of the job-performing apparatus is completed;
receiving approval of authentication from the first cloud;
acquiring the authentication-related information from the storage area if the authentication-related information is not present in the memory; and
in response to determining that the job-performing apparatus is deleted from the first cloud, deleting the authentication-related information from the storage area and beginning a new registration process.

* * * * *